United States Patent [19]

Levy

[11] 4,120,213
[45] Oct. 17, 1978

[54] SELF-BALANCING CONTINUOUS POWER TRANSMISSION SYSTEM AND METHOD

[76] Inventor: Abraham Levy, 44 Alumim St., Afeka, Tel Aviv, Israel

[21] Appl. No.: 619,878
[22] Filed: Oct. 6, 1975
[51] Int. Cl.² .............................................. F16H 47/08
[52] U.S. Cl. ...................................................... 74/688
[58] Field of Search ............... 74/688; 60/388; 417/47

[56] References Cited

U.S. PATENT DOCUMENTS

| 2,372,326 | 3/1945 | Hewitt | 417/47 |
|---|---|---|---|
| 3,132,536 | 5/1964 | Samietro | 74/688 |
| 3,202,277 | 8/1965 | General | 74/688 |
| 3,225,732 | 12/1965 | Carlsen | 74/688 |
| 3,311,200 | 3/1967 | Hayward | 74/688 |
| 3,362,259 | 1/1968 | Hayward | 74/688 |
| 3,500,704 | 3/1970 | Müller et al. | 74/688 |
| 3,587,345 | 6/1971 | Johnson | 74/688 |
| 3,924,489 | 12/1975 | Yasuda | 74/688 |

Primary Examiner—Benjamin W. Wyche
Assistant Examiner—Wesley S. Ratliff, Jr.
Attorney, Agent, or Firm—Benoit Law Corporation

[57] ABSTRACT

A method of torque transmission between a prime mover and a load comprises the provision of a planetary system and a hydraulic torque coupling, the interconnection of the planetary system and the hydraulic torque coupling in a feedback loop, the coupling of the prime mover to the planetary system, the driving of the hydraulic torque coupling with the prime mover through the planetary system, and the transfer of output torques of the planetary system and the hydraulic torque coupling to the load.

A transmission system for operation between a prime mover and a load comprises a planetary system and a hydraulic torque coupling which are included in a feedback loop. The planetary system is coupled to the prime mover, the hydraulic torque coupling is driven with the prime mover through the planetary system, and output torques of the planetary system and the hydraulic torque coupling are transferred to the load.

66 Claims, 9 Drawing Figures

4,120,213

SELF-BALANCING CONTINUOUS POWER TRANSMISSION SYSTEM AND METHOD

PRIORITY CLAIM

The subject inventor herewith claims the benefit of the filing date of Oct. 6, 1974 under 35 USC 119 from his patent application No. 45791, filed in the State of Israel on said Oct. 6, 1974 for the subject invention.

BACKGROUND OF THE INVENTION

1. Field of the Invention

The invention relates to transmission systems for transferring rotational motion from a prime mover to a load, and more specifically to transmission systems having continuously variable power/speed transmission ratios dependent on and automatically adjustable as a function of the operational conditions of the system. In terms of utility, the transmission system according to the present invention is particularly, but by no means exclusively, useful in the automotive industry, to replace any and all types of the presently used, so-called "Automatic Gearing Transmissions". However, the transmission system will also be most efficient in other, non-vehicular installations, whether requiring variable ratios or not.

2. Prior-Art Background

It seems advisable to commence this discussion by listing the general objectives that should be attained through the exploitation of this invention, and for this purpose there should be first noted the main requisites that are to be satisfied by an ideal transmission system, namely:

(1) Highest possible efficiency of power transmission over all applicable load ranges;

(2) Capability of handling extreme changes in output-/input power during normal operation of the motor/load, respectively.

(3) Protection of the motor in cases of overloading and capability of braking the load to instantaneous "dead stop" without causing damage to the motor; (4) Smooth gradual increase and decrease of input power and elimination of shocks and vibrations;

(5) Capability of utilizing the motor as speed retarding element of the system;

(6) Simple, inexpensive and highly reliable construction; and (7) Convenient installation, maintenance and repair of the system.

To attain as many as practicable of the above listed features, great efforts have been expended in the development of automatic transmission systems, especially, if not exclusively, for motor vehicle purposes.

Before proceeding with the description of the state of the art, and for the better understanding and evaluation thereof, few basic terms and devices should be briefly discussed.

Planetary, or Epicyclic Gear Train

The characteristic feature of such units is that they comprise at least one gear wheel whose axis revolves about the axis of another gear wheel. The number of ways in which the gears may be arranged is infinite. However, for the purposes of this preliminary discussion (further elaboration will be made in conjunction with the description of the various embodiments of the invention), let us consider a most simple case wherein the gear train comprises a spur gear (or gears) ("planets") rotatably mounted on a "carrier" (or "cage") driven by a drive shaft ("the first shaft"). The planets mesh on the one hand with a ring or internal gear ("annulus") and on the other hand with a spur gear ("sun") mounted on a "second shaft".

Basically, the unit can be operated in four manners, namely:

(a) The first shaft and the planets are rotatable while the annulus is held fixed;

(b) The first shaft and the planets are rotatable while the sun is held fixed;

(c) The first and the second shafts are rotatable while the planets are stationary with respect to their axles. (The sun gear rotates together with the carrier).

(d) The second shaft, the planets and the annulus are rotatable while the first shaft is fixed.

It can be shown that if, for example, the annulus/sun gear ratio equals 2, the transmission ratios in the above listed cases will be as follows:

(a) The speed of the second shaft will be 3 times that of the first shaft, and in the same direction;

(b) The speed of the annulus will be 3/2 times of the speed of the first shaft, and in the same direction;

(c) The two shafts and the annulus rotate at one and the same speed and direction;

(d) The speed of the second shaft will be 2 times that of the annulus, and in the opposite direction.

Thus, with a three-element planetary gear train, four distinct speed ratios are obtained, depending on the elements held fixed. These capabilities make planetary arrangements valuable in the automatic transmissions of automobiles, as will be further explained below.

Differential Gear Train

This transmission system is, in fact, a special form of a planetary gear train, wherein all gears are conical. The axis of each planet is perpendicular to the axis of the carrier driving shaft (the above mentioned "first shaft"). The planets mesh with a pair of conical gears, mostly identical to each other, both being regarded as "sun" gears. Usually each sun is connected to a separate shaft, both aligning with each other and with the axis of the first shaft.

In the case there are only three basic transmission possibilities (assuming that the sun gears are identical), namely:

(a) The first shaft and the planets are rotatable while either of the sun gears is fixed — the other sun gear will then rotate at 2 times the speed of the first shaft, in the same direction.

(b) All shafts are rotatable while the planets are stationary with respect to their axles — the shafts will rotate at one and the same speed and direction.

(c) One of the sun shafts, and the planets are rotatable, while the first shaft is fixed — the other sun will rotate at the speed of the first sun, but in the opposite direction.

As it is well known, this differential transmission serves as divider for the rear wheels of motor cars.

Hydraulic Coupling

A hydraulic coupling is a combination of a centrifugal pump and a hydraulic turbine. In the hydraulic coupling, the rotating input or primary shaft drives a centrifugal pump-runner or impeller. This usually has straight radial vanes or blades; in construction it resembles a grapefruit half, with the fruit removed. As the pump impeller builds up speed, kinetic energy is added to the fluid, which flows outward along the vanes, and enters the turbine runner. Usually the turbine runner is similar in construction to the pump impeller, with straight radial blades. There is no solid connection between the impeller and the turbine. After sufficient energy has been developed, the liquid turns the turbine, which is connected to the output shaft; the linkage between the input and output shafts is solely through the medium of the fluid.

In the hydraulic coupling the output torque generally equals the input torque. The speed of the input shaft always exceeds that of the output shaft. At the start of operation, the input shaft rotates while the output shaft remains stationary; the "slippage" is 100%; at normal operational conditions, the slip may be as low as 1%–4%. The efficiency of the coupling, namely the ratio of the power output to the power input may be as high as 95%–99%. The full power output capability of the unit develops gradually as the turbine member gains speed. Torsional vibrations or shocks on either shaft of the hydraulic coupling are damped by the fluid. The load on the output shaft may be stalled without stalling the impeller or input shaft.

Fluid Torque Converter

This device is essentially a hydraulic coupling comprising, besides the impeller and the turbine, a so-called "stator" or "reactor" having fixed or stationary vanes for changing the flow direction of the fluid. The fixed guide vanes take some reaction, which is borne by a stationary housing or foundation; thus the impeller torque does not equal the turbine torque.

The torque converter also provides smooth starting of the load and absorbs torsional shocks and vibrations. If extreme loads on the output shaft of the converter stall the output shaft during operation, the input shaft will not stall but will continue running. Conventional torque converters may develop a starting output torque of about 2.2 times the input torque.

The efficiency of a converter is defined as the ratio of the power at the output shaft divided by the power at the input shaft. In general, the efficiency of a torque converter is less than that of the hydraulic coupling, reaching the maximum at intermediate speeds, with zero efficency at zero output shaft speed and also when the input and output shafts rotate at the same speed.

A torque converter can be arranged to operate as a fluid coupling in case the stator is arranged with a free wheeling device so that the vanes do not give any reaction to the fluid at certain speeds. Thus, the fluid transmission can act as a torque converter with the guide vanes fixed at low speeds, at high speed the guide vanes can freewheel with no torque reaction, allowing the unit to operate as a fluid coupling. Thus the unit utilizes the principle of both the torque converter and the fluid coupling in their most effective speed ranges.

One of the most common applications of the torque converter is in automotive transmissions.

Automatic Gearing Transmission (for automobiles)

Presently common, worldwide used automatic transmissions employ a hydraulic coupling or torque converter with automatic mechanism for planetary gear trains shifting to attain the required steps of the transmission ratio. Manual selection means of low range are provided that either prevents automatic up-shifts or employs automatic shifting when used in normal driving. Grade-retard provisions are also sometimes included to provide engine braking on down hills.

The mostly used units include two planetary gear trains aligned on the main shaft, each of which comprises a sun gear, an annulus, and a set of planet gears interposed between them. The planetary trains provide three forward speeds and the reverse gear. A front hydraulic torque converter is used to drive the planetary units.

An independent hydraulic control system operates a series of mechanical clutches, each setting a different basic operational manner of the planetary gear system.

Additional means are of course provided for the remaining operative conditions, namely "neutral" and "reverse", but, for the purposes of this discussion, there is no need to go into further details in this respect.

However, what should be strongly emphasized is that all (step-wise) shiftings are effected hydraulically by a load/speed-sensitive governing device that changes the position of valves controlling the flow of hydraulic fluid. The vehicle speeds at which shifts occur depend also upon the position of the accelerator pedal.

Other types of conventional automatic gearing transmission differ only in minor design details such as the number of planetary gear units employed and the relative disposition thereof, and in various means provided for attaining higher effectiveness of the hydraulic torque converter always provided for transmitting the engine power to the gears.

Examination as to what extent the above listed operational requisites of a transmission system are satisfied by the conventional automotive gearing transmission will lead to the following conclusions:

(1) Efficiency over all load ranges: Conventional transmissions — although being called "automatic" — inherently do not adapt themselves to varying power transmission requirements, since they essentially possess a limited, preselected number of transmission gear ratios (normally three). On the one hand, the efficiency of an internal combustion engine is maximum only at a specific, narrow, revolutions-per-minute range; the load, on the other hand, varies and fluctuates extremely, and even with the most effective and quick-responsive shifting mechanisms, no absolute matching can be achieved under all applicable circumstances, but only at such incidents where the specific gear ratio at the optimal speed of engine corresponds to the actual driven load. In addition to that, a certain loss of speed-momentum of the vehicle occurs between shiftings.

(2) Handling extreme output/input powers: As above explained, the automatic transmission is not really automatic in the sense that an absolute compatibility, or matching, exists between input and output powers. What actually is performed is a simulation by mechanical (or hydraulical) means of the traditional manual gear shifting operations. Similar to the driver's manipulative capabilities, there exists in automatic transmissions the time factor which restricts the instantaneous adaptation of the gear ratio to the applicable load and speed. Furthermore, while in the non-automatic transmission, the driver can pick up any of the available gears according to his judgment, in the automatic system, the order of shiftings is pre-set, which is, of course, adequate for normal conditions but may prove unsatisfactory in extreme cases. It should however be mentioned that this deficiency is partly overcome by various improvements introduced in the kinetic capabilities of the fluid torque converters.

Requisites (3) and (4) are quite properly satisfied through use of the hydraulic coupling or torque converter, regardless of the gear transmission type employed. Nevertheless, light jerks are still felt upon shifts.

(5) Utilization of engine braking effect: This feature is important for safety reasons, to avoid excessive speed of the vehicle in downhill roads. Due to the incorporation of a fluid torque converter between the engine and the gear train, having limited stalling capabilities, the self-retarding effect of the engine is almost eliminated, and there is no protection against dangerous accelerations. Usually, in order to partly overcome this deficiency, an overriding clutch unit is employed, however, the effectiveness of this device is noticeable mainly at considerably high speeds.

Requisites (6) and (7) are far from being satisfactorily fulfilled. Although presently produced by the millions, the systems are relatively expensive, complicated in design and construction, and difficult to repair in case of a failure in their components and sub-assemblies.

SUMMARY OF THE INVENTION

For the purposes of this Specification and in the appended claims, the below listed terms shall have the following meaning unless the context, expressly, or by implication, provides otherwise:

Planetary System — Planetary or epicyclic transmission system including at least a first member rotatable by a carrier member about its own axis as well as about the carrier axis, which is parallel or at an angle with respect to said first mentioned axis, and at least second and third members each coupled to said first member and rotatable about an axis aligned with respect to said carrier axis.

Planet Member — The said first member or, if applicable, any one of a plurality of such first members.

Sun Member — Either or both of said second and third members or, if applicable, any one of a plurality of such second or such third members, provided that said planet member is coupled to the external circumference of such second and/or such third members.

Annulus Member — The said third member or, if applicable, any one of a plurality of such third members provided that said first member is coupled to an internal circumference of such third member.

Note: If not specifically otherwise denoted, the term Annulus shall also include a second sun member constituting said third member, e.g. in Differential Planetary Systems.

Hydraulic Coupling — A hydraulic coupling comprising a housing for the hydraulic fluid, an impeller wheel and a turbine wheel rotatable within said housing.

Hydraulic Torque Converter — A hydraulic coupling provided with a stator wheel for directing the fluid on its path between the impeller wheel and the turbine wheel.

Hydraulic Torque Coupling — A hydraulic coupling or a torque converter.

It is a broad object of the present invention to provide improved methods of transferring rotational movement, and improved transmission systems utilizing such improved methods, that will overcome the above mentioned disadvantages.

It is a further object of the invention to provide an improved transmission system that will operate at optimal efficiency, regardless of variations of the load.

It is a still further object of the invention that the improved transmission system shall incorporate a closed feed-back loop, resulting in an inherent characteristic of the system always to achieve equalization or balance between the input and output torques speed.

It is a still further object of the present invention to adapt the improved transmission system for use in vehicular and nonvehicular installations.

From one aspect thereof, the subject invention resides in a method of torque transmission between a prime mover and a load, comprising in combination the steps of providing a planetary system including first, second and third members, providing a hydraulic torque coupling, having an input and an output interconnecting said planetary system and said hydraulic torque coupling in a feedback loop torque coupling in a feedback loop by rigidly connecting said first member to said input and rigidly connecting said output with said second member, coupling said prime mover to said third member of the planetary system, and transferring the output torques of the planetary system and the hydraulic torque coupling from said second member and said output to the load.

In accordance with preferred embodiments of the invention, the output torque of the prime mover may be applied to the planet member of said planetary system, a first portion of the output torque of either the sun or the annulus members may be transferred to the impeller of said hydraulic torque coupling and a second portion of said sun or annulus output torque to the load, a first portion of the output torque of the turbine wheel may be transferred to the other of said sun or annulus member and a second portion of said turbine wheel output torque to the load.

From another aspect thereof, the subject invention resides in a transmission system for operation between a prime mover and a load, comprising in combination a planetary system including first, second and third members, a hydraulic torque coupling having an input and an output, means for providing a feedback loop including said planetary system and said hydraulic torque coupling, hydraulic torque coupling, said feedback loop providing means including means for rigidly connecting said first member to said input, and means for rigidly connecting said output to said second member, means connected to said planetary means connected to said planetary system for coupling said third member of the planetary system to said prime mover, and means coupled to said second member of the planetary system and said output of the hydraulic torque coupling for transferring output torques of said planetary system and said hydraulic torque coupling to the load.

According to a preferred embodiment of the invention the sun member is coupled to the impeller wheel, both being rotatably mounted on a shaft, and the annulus member is coupled to the turbine wheel, both being fixedly mounted on said shaft.

From another aspect thereof, the subject invention resides in a transmission system for operation between a prime mover and a load, comprising in combination a planetary system including first, second and third members, a hydraulic torque coupling having an input and an output, means for providing a feedback loop including said planetary system and said hydraulic torque coupling, said feedback loop providing means including means for interconnecting said first member with said input, and means for interconnecting said output with said second member, means connected to said planetary system for coupling said third member of the planetary system to said prime mover, and means coupled to said second member of the planetary system and said output of the hydraulic torque coupling for transferring output torques of said planetary system and said hydraulic torque coupling to the load, said planetary system including a sun member as one of said first and second members and an annulus member as the other of said first and second members, said hydraulic torque coupling including an impeller wheel at said input and turbine wheel means at said output, said system including means for coupling said sun member to said impeller wheel and said annulus member to said turbine wheel, and said system including a shaft and means for mounting the sun and annulus members and the impeller and turbine wheels on said shaft.

From another aspect thereof, the subject invention resides in a transmission system for operation between a prime mover and a load, comprising in combination first and second shafts, a planetary system including first, second and third members, means for fixedly mounting the first member on the first shaft, means for rotatably mounting said second member on the first shaft, a hydraulic torque coupling having an input and an output, with an impeller wheel at the input and a turbine wheel at the output of said hydraulic torque coupling, the impeller wheel being rotatably mounted on the second shaft, means for fixedly mounting the turbine wheel on the second shaft, means for providing a feedback loop including said planetary system and said hydraulic torque coupling, said feedback loop providing means including means for coupling the impeller wheel to the first shaft and means for coupling the second member to the second shaft, means connected to said planetary system for coupling said third member of the planetary system to said prime mover, and means coupled to said second member of the planetary system and said output of the hydraulic torque coupling for transferring output torques of said planetary system and said hydraulic torque coupling to the load.

From another aspect thereof, the subject invention resides in a self-balancing continuous power transmission method of transmitting power at continuously varying power/speed transmission ratios between a prime mover and a variable load, comprising in combination the steps of providing a planetary system including first, second and third members, providing a hydraulic torque coupling having an input and an output, interconnecting said planetary system and said hydraulic torque coupling in a feedback loop by rigidly connecting said first member to said input and rigidly connecting said output to said second member, coupling said prime mover to said third member of the planetary system, transferring both the output torque of the planetary system and the output torque of the hydraulic torque coupling from said second member and said output to the load, and automatically and continuously adapting through said feedback loop, and in response to power/speed fluctuations, output power of the planetary system and hydraulic torque coupling to input power provided by the prime power.

From another aspect thereof, the subject invention resides in a self-balancing continuous power transmission method of transmitting power at continuously varying power/speed transmission ratios between a torque providing prime mover and a variable load, comprising in combination the steps of providing a planetary system including first, second and third members, providing a hydraulic torque coupling having an input and an output, interconnecting said planetary system and said hydraulic torque coupling in a feedback loop by rigidly connecting said first member to said input and rigidly connecting said output to said second member, coupling said prime mover to the third member of the planetary system, transferring the output torques of the planetary system and the hydraulic torque coupling from said second member and said output to the load, and portioning with said feedback loop as a function of the magnitude of the load the torque provided by the prime mover into a first component attributed to the planetary system and into a second component attributed to the hydraulic torque coupling and constituting said first and second components as output torque for the load.

From another aspect thereof, the subject invention resides in a self-balancing continuous power transmission system for transmitting power at continuously varying power/speed transmission ratios between a prime mover and a variable load, comprising in combination a planetary system including first, second and third members, a hydraulic torque coupling having an input and an output, means connected to said planetary system for coupling said third member of the planetary system to said prime mover, means coupled to said second member of the planetary system and said output of the hydraulic torque coupling for transferring both the output torque of said planetary system and the output torque of said hydralic torque coupling to the load, and means for providing a feedback loop including said planetary system and said hydraulic torque coupling and for automatically and continuously adapting through said feedback loop, and in response to power/speed fluctuations, output power of the planetary system and hydraulic torque coupling to input power provided by the prime mover, said feedback loop providing means including means for rigidly connecting said first member to said input, and means for rigidly connecting said output to said second member.

From another aspect thereof, the subject invention resides in a self-balancing continuous power transmission system for transmitting power at continuously varying power/speed transmission ratios between a prime mover and a variable load, comprising in combination a planetary system including first, second and third members, a hydraulic torque coupling having an input and an output, means connected to said planetary system for coupling said third member of the planetary system to said prime mover, means coupled to said second member of the planetary system and said hydraulic torque coupling for transferring output torques of said planetary system and said hydraulic torque coupling to the load, and means for providing a feedback loop including said planetary system and said hydraulic torque coupling for portioning, as a function of the magnitude of the load, torque provided by the prime mover into a first component attributed to the planetary system and into a second component attributed to the hydraulic torque coupling whereby said first and second components are constituted as output torque of the load, said feedback loop providing means including means for rigidly connecting said first member to said input, and means for rigidly connecting said output to said second member.

From another aspect thereof, the subject invention resides in a method of torque transmission between a prime mover and a load, comprising in combination the steps of providing a planetary system with first, second and third members, providing a hydraulic torque coupling with an impeller wheel and a turbine wheel, interconnecting said planetary system and said hydraulic torque coupling in a feedback loop, coupling said prime mover to said third member, rigidly connecting one of said first and second members to the impeller wheel and transferring a first portion of the output torque of said one of said first and second members to the impeller wheel of the hydraulic torque coupling, transferring a second portion of the output torque of said one of said first and second members to the load, rigidly connecting the turbine wheel to the other of said first and second members and transferring a first portion of the output torque of the turbine wheel to the other of said first and second members, and transferring a second portion of the output torque of said turbine wheel to the load.

From another aspect thereof, the subject invention resides in a transmission system for operation between a prime mover and a load, comprising in combination a planetary system including a sun member, a planet member and an annulus member, a hydraulic torque coupling including an impeller wheel and a turbine wheel, means for providing a feedback loop including said planetary system and said hydraulic torque coupling and including means for coupling one of said sun and annulus members to one of said impeller and turbine wheels and means for coupling the other of said sun and annulus members to the other of said impeller and turbine wheels, means connected to said planetary system for coupling said planet member to said prime mover, and means coupled to said planetary system and said hydraulic torque coupling for transferring output torques of said planetary system and said hydraulic torque coupling to the load.

From another aspect thereof, the subject invention resides in a transmission system for operation between a prime mover and a load, comprising in combination a planetary system including first sun gear means, second sun gear means, first planet gear means meshing with said second sun gear means, and second planet gear means meshing with said first sun gear means and said first planet gear means, a hydraulic torque coupling including impeller and turbine wheels, means for providing a feedback loop including said planetary system and said hydraulic torque coupling including means for connecting said impeller wheel to one of said first and second sun gear means, and means for coupling the other of said first and second sun gear means and the turbine wheel to said load, means connected to said planetary system for coupling said first planet gear means to said prime mover, and means coupled to said planetary system and said hydraulic torque coupling for transferring output torques of said planetary system and said hydraulic torque coupling to the load.

From another aspect thereof, the subject invention resides in a method of torque transmission between a prime mover and a load, comprising in combination the steps of providing a planetary system, providing a hydraulic torque coupling having an input and an output, interconnecting said planetary system and said hydraulic torque coupling in a feedback loop by rigidly connecting a first part of said planetary system to said input of the hydraulic torque coupling, and rigidly connecting said output of the hydraulic torque coupling to a second part of said planetary system, coupling said prime mover to a third part of said planetary system, driving said hydraulic torque coupling with said prime mover through said planetary system, and transferring the output torques of the planetary system and the hydraulic torque coupling to the load.

From another aspect thereof, the subject invention resides in a transmission system for operation between a prime mover and a load, comprising in combination a planetary system, a hydraulic torque coupling having an input and an output, means for providing a feedback loop including said planetary system, said hydraulic torque coupling, means for rigidly connecting a first part of said planetary system to said input of the hydraulic torque coupling, and rigidly connecting said output of the hydraulic torque coupling to a second part of said planetary system, means connected to said planetary system for coupling a third part of said planetary system to said prime mover, means connected to said planetary system and to said hydraulic torque coupling for driving said hydraulic coupling with said prime mover through said planetary system, and means coupled to said planetary system and said hydraulic torque coupling for transferring output torques of said planetary system and said hydraulic torque coupling to the load.

From another aspect thereof, the subject invention resides in a self-balancing continuous power transmission method of transmitting power at continuously varying power/speed transmission ratios between a prime mover and a variable load, comprising in combination the steps of providing a planetary system, providing a hydraulic torque coupling having an input and an output, interconnecting said planetary system and said hydraulic torque coupling in a feedback loop by rigidly connecting a first part of said planetary system to said input of the hydraulic torque coupling, and rigidly connecting said output of the hydraulic torque coupling to a second part of said planetary system, coupling said prime mover to a third part of said planetary system, driving said hydraulic torque coupling with said prime mover through said planetary system, transferring both the output torque of the planetary system and the output torque of the hydraulic torque coupling to the load, and automatically and continuously adapting through said feedback loop, and in response to power/speed fluctuations, output power of the planetary system and hydraulic torque coupling to input power provided by the prime mover.

From another aspect thereof, the subject invention resides in a self-balancing continuous power transmission method of transmitting power at continuously varying power/speed transmission ratios between a torque providing prime mover and a variable load, comprising in combination the steps of providing a planetary system, providing a hydraulic torque coupling having an input and an output, interconnecting said planetary system and said hydraulic torque coupling in a feedback loop by rigidly connecting a first part of said planetary system to said input of the hydraulic torque coupling, and rigidly connecting said output of the hydraulic torque coupling to a second part of said planetary system, coupling said prime mover to a third part of the planetary system, driving said hydraulic torque coupling with said prime mover through said planetary system, transferring the output torques of the planetary system and the hydraulic torque coupling to the load, and portioning with said feedback loop as a function of the magnitude of the load the torque provided by the prime mover into a first component attributed to the planetary system and into a second component attributed to the hydraulic torque coupling and constituting said first and second components as output torque for the load.

From another aspect thereof, the subject invention resides in a self-balancing continuous power transmission system for transmitting power at continuously varying power/speed transmission ratios between a prime mover and a variable load, comprising in combination a planetary system, a hydraulic torque coupling having an input and an output, means connected to said planetary system for coupling said planetary system to said prime mover, means coupled to said planetary system and said hydraulic torque coupling for transferring both the output torque of said planetary system and the output torque of said hydraulic torque coupling to the load, and means for driving said hydraulic torque coupling with said prime mover through said planetary system and providing a feedback loop including said planetary system and said hydraulic torque coupling and for automatically and continuously adapting through said feedback loop, and in response to power/-speed fluctuations, output power of the planetary system and hydraulic torque coupling to input power provided by the prime mover, said means for driving said hydraulic torque coupling including means for rigidly connecting a first part of said planetary system to said input of the hydraulic torque coupling, and rigidly connecting said output of the hydraulic torque coupling to a second part of said planetary system.

From another apsect thereof, the subject invention resides in a self-balancing continuous power transmission system for transmitting power at continuously varying power/speed transmission ratios between a prime mover and a variable load, comprising in combination a planetary system, a hydraulic torque coupling having an input and an output, means connected to said planetary system for coupling said planetary system to said prime mover, means coupled to said planetary system and said hydraulic torque coupling for transferring output torques of said planetary system and said hydraulic torque coupling to the load, and means for driving said hydraulic torque coupling with said prime mover through said planetary system and providing a feedback loop including said planetary system and said hydraulic torque coupling for portioning, as a function of the magnitude of the load, torque provided by the prime mover into a first component attributed to the planetary system and into a second component attributed to the hydraulic torque coupling whereby said first and second components are constituted as output torque for the load, said means for driving said hydraulic torque coupling including means for rigidly connecting a first part of said planetary system to said input of the hydraulic torque coupling, and rigidly connecting said output of the hydraulic torque coupling to a second part of said planetary system.

There has thus been outlined rather broadly the more important features of the method and system according to the present invention in order that the detailed description thereof that follows may be better understood, and in order that the present contribution to the art may be better appreciated. There are, of course, additional or different features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent construction as do not depart from the spirit and the scope of the invention.

BRIEF DESCRIPTION OF THE DRAWINGS

Several specific embodiments of the invention have been chosen for purposes of illustration and description, and are shown in the accompanying drawings, forming a part of the specification, wherein like reference characters designate like or functionally equivalent parts, and wherein.

DESCRIPTION OF PREFERRED EMBODIMENTS

Figure 1:
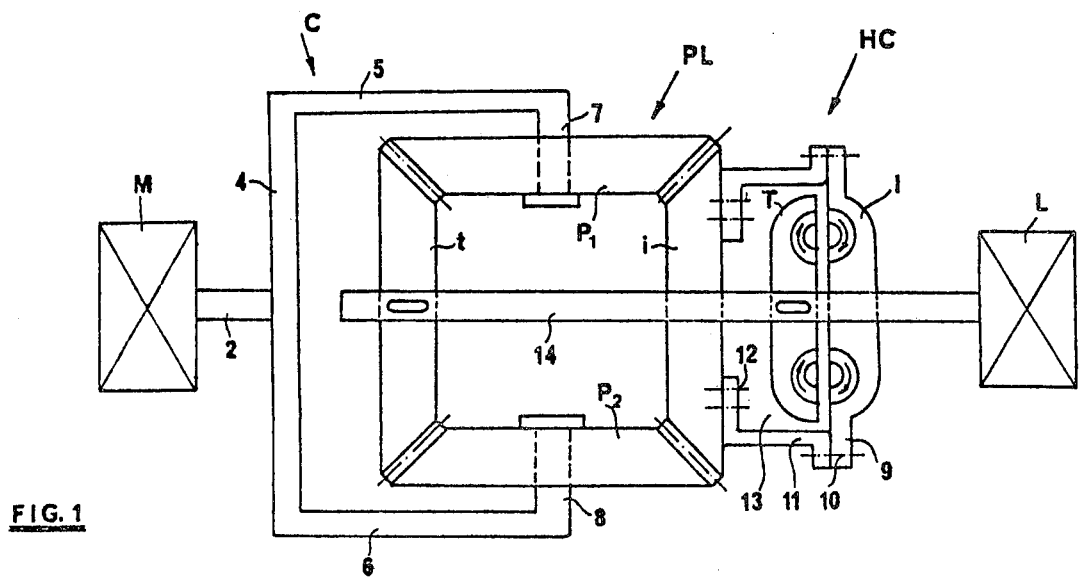
FIG. 1 shows schematically a first embodiment of the invention comprising a differential planetary gear train transmission.

The system illustrated in FIG. 1 comprises a motor M driving the shaft 2. The shaft 2 has fixed thereto a member C (the "carrier") comprising a cross-rod 4, two arms 5, 6, having extensions 7, 8 on which there are rotatably mounted conical gear wheels $P_1$, $P_2$ ("Planets") of the planetary gear system, generally indicated PL.

It should be noted that any other equivalent carrier or "cage" for transmitting the motor's output to the planets may be used, as they are well known in the art of mechanical differential transmissions, and the number of planet gear wheels may be three or more as convenient.

The planetary gear system comprises a pair of sun gear wheels designated $t$ and $i$, meshing with planets $P_1$, $P_2$. For the purposes of this example all gear wheels are identical, i.e. in ratio 1:1 with respect to each other.

Adjacent the planetary gear system PL, and operatively associated therewith, there is provided a hydraulic torque coupling represented in this embodiment by the hydraulic coupling generally designated HC. Basically this system consists of the impeller wheel I constituting an input and the turbine wheel T constituting an output. The flange 9 of the impeller I is fastened by bolts 10 to the housing member 11, the other side thereof being fixed by bolts 12 to the back side of the gear wheel $i$ as shown. Thus, an enclosed compartment 13 of the hydraulic fluid of the coupling is formed and the sun member or gear wheel $i$ is rigidly connected to the impeller wheel or hydraulic torque coupling input $i$.

As above explained, there are known in the art numerous types of hydraulic torque couplings and it should be noted that inasmuch as this invention is concerned all such devices and any variations thereof may be employed.

The planetary system PL and the hydraulic coupling HC are operatively connected in the following manner: There is provided a shaft 14 extending through gears $t$ and $i$, as well as the impeller and turbine wheels I, T. The gear $t$ and the turbine T are fixedly mounted on or keyed to the shaft, and gear $i$ and impeller I are freely rotatable thereon as a single unit due to the rigid connection formed by the housing member 11. The shaft 14 is suitably supported by bearings (not shown).

The right-hand extension of the shaft 14 constitutes the output side of the unit, shown schematically as the load L. This load shall herein be regarded, for the purposes of this example, as representing the driving shaft of a motor-car. However, it should be noted that any kind of output load — whether constant or variable — may be operated by the transmission system according to the present invention.

The operation of the system shall now be described. Assuming first that the motor or engine M rotates shaft 2 at a constant velocity, and that, due to an initial heavy load, shaft 14 is temporarily blocked. Sun gear $t$ therefore remains at a standstill. The carrier member C turns, causing planets $P_1$ and $P_2$ to rotate about the gear $t$, this resulting also in the rotation of the planets $P_1$, $P_2$ about their own axles 7 and 8, respectively.

The combined effect of these two rotational movements is to rotate sun gear $i$ (and impeller I) at a velocity twice (in this example) that of the input shaft 2. As known, the torque transmitted by the impeller to the turbine, when the latter is at standstill, is maximum. As will be explained below, a reactive hydraulic torque (i.e. a resistive tortional moment against the rotation of the impeller within the hydraulic fluid) is now generated, causing part of the motor input power to act mechanically on the shaft 14 via gear $t$.

Suppose now that under this compounded (mechanical and hydraulic) and exceeded (hydraulic) torque the car starts to run at a gradually increasing speed, i.e. shaft 14 starts gradually to rotate together with gear $t$ and turbine T. Rotation of gear $t$ results in reducing the velocity of the gear $i$, because planets $P_1$, $P_2$, now rotate more slowly about their own respective axles 7, 8. Arithmetically expressed, the number of revolutions per time unit of gear $i$ ($i_r$) will equal the motor's revolutions ($M_r$) plus the differences between $M_r$ and the load revolutions ($L_r$), or $i_r = M_r + (M_r - L_r) = 2 M_r - L_r$ Further mathematical analysis of the system will be given below.

Since the turbine T is gaining speed, the combined effect is that the magnitude of the torque now transmitted by the hydraulic coupling is reduced, as a function of the reduction in the relative velocity between wheels I and T. Assuming that the process continues until shaft 14 reaches the speed of shaft 2, then the result will be the following: Planets $P_1$, $P_2$ will still revolve about the axis of the shaft 2 together with the carrier C, but their spinning about their own axles will stop; nonrelative rotational movement between planets $P_1$, $P_2$, and gears $t$, $i$, shall exist. The same shall apply with respect to impeller I and turbine T. This state or position of the unit shall be hereinafter referred to as "the equilibrium".

It will be readily understood from the foregoing description that it is an inherent feature of the transmission system according to the present invention, that the equilibrium position is always tended to be reached, i.e. that, due to the feedback loop established between the hydraulic coupling and the planetary system, the output power always adapts itself to the input power, while the balance between the two is automatically achieved, irrespective of any power/speed fluctuation (relative decrease of increase) occurring in either of them.

Now suppose that a reduction of speed is caused at the output side of the unit, due, say, to higher load on the car's wheels. Rotation of gear $t$ will start to retard, instantly resulting in a two-fold speed increase (in the given example) of the impeller relative to the turbine. A higher hydraulic torque will immediately be generated, tending to accelerate the turbine speed and thus to overcome the said higher load.

The amplified difference between the impeller and turbine speeds instantly drives the operation of the hydraulic coupling into the high efficiency region thereof. This is an extraordinary advantage of the system according to the present invention especially if a hydraulic torque converter is employed.

Evidently, an analogical effect will be achieved when the motor speeds up. At first, due to the additional revolutions of the carrier C, relative rotational movement of planets $P_1$, $P_2$ with respect to gear $t$ will be generated, adding speed to gear $i$ and impeller I. Quantitively, the added speed of gear $i$ equals twice the difference between the motor's former and latter speeds. A new hydraulic torque will be transmitted to the turbine T, tending to accelerate the rotation of the drive shaft 14. The moment the drive shaft 14 gains the new, higher speed the planetary system will again come to the equilibrium as above described, while the impeller and turbine run together as a unit at the same speed.

Assuming the difference between the added speed of the motor and the former speed of the load is considerably high, or, alternatively, that the motor is started while the load is at standstill (as in the first above mentioned case), then, the following process is developed:

Impeller wheel I turns relatively fast with respect to the turbine T, the hydraulic coupling thus transmitting the maximum hydraulic torque according to its design specifications. It has already been mentioned that a reactive torque is simultaneously exerted on the impeller and on the gear $i$, tending to stall the same. As a result, even though the turbine T and gear $t$ are still stationary (or rotating at a speed considerably less than that of impeller I and gear $i$), a certain part of the input torque supplied by the motor is now mechanically exerted directly from the motor through carrier C, the planets $P_1$, $P_2$, the gear $t$ and shaft 14 on the load L. It may be descriptively said that the power overflow channels itself through the least resistive way. So the planets, by "leaning" on the gear $i$, which is impeded from further acceleration by the turbulence of the hydraulic fluid, transfer a portion of their circumferential rotation to the gear $t$.

The exact proportions of the hydraulic and mechanical components of the output torque under any given conditions of operation depend on the rate by which the load speed equalizes with the motor speed.

It should therefore be borne in mind that the power transmitted by the motor to the load, under transient conditions, always flows in two "parallel" paths namely, the hydraulic path, represented by the hydraulic coupling HC, and the mechanical path, represented by the planetary gear system PL. The relative magnitude of the two components of the transferred torque varies under the changing operational conditions. However, at the equilibrium position the said two paths coincide or merge into a unified power path.

It should be mentioned that for the purposes of simplifying the explanation of the principles of the present invention, the efficiency factor of the hydraulic coupling has been assumed to equal 1, and that, at the equilibrium, the impeller drives the turbine at one and the same speed. In other applications, the efficiency factor is only about 0.95–0.99; therefore, the power transmission ratio of any hydraulic coupling per se is less than 1:1. However, due to the features of the system of this invention, an overall revolutions transmission ratio of 1:1 is achieved between the motor and the load.

Now let us consider the opposite case, namely where the load transfers power to the motor. Following the motor-car example, this will be the situation of driving downhill, while the motor constitutes a "brake" to the accelerated movement due to gravity.

Assuming that the system is at equilibrium and that the motor's speed $M_r$ is held constant on the one hand, while on the other hand, the shaft 14 starts to increase speed, together with gear $t$ and turbine T ($L_r$ is greater than $M_r$). Planets $P_1$ and $P_2$ will continue to revolve about shaft 2 at the same circumferential velocity as before, but will also start to spin about axles 7, 8 in a direction opposite to which they had before reaching the equilibrium state, as above described. Gear $i$ — rotating before exactly at the carrier's speed $M_r$ — will consequently reduce speed by the difference between $L_r$ and $M_r$.

Simultaneously, the same speed difference is established within the hydraulic coupling, resulting in a hydraulic torque emanating from the turbine T to the impeller I causing the impeller to gain speed, i.e. to accelerate the carrier C against the braking effect of the motor.

As above explained, it is an inherent feature of the system that there is always maintained the co-existence of both hydraulic and mechanical torques, in such a manner that one induces or reacts the other, while both acting simultaneously in the direction of establishing a complete balance between the input and the output powers supplied to and delivered by the system, respectively.

Applying this rule to the situation in question, the turbine originated hydraulic torque acting on the impeller I is mechanically transferred to gear $i$, inducing the planets to reach their standstill position, which can only be achieved after the carrier gains the speed of gear $t$. If the motor's resistance persists, it means that it effectively brakes the velocity of the load.

It can be shown that the transmission ratio of the system of this invention is governed by the following formula:

$$M_r: M_r + (M_r - L_r) \times D_t/D_i \text{ or}$$

$$1:1 + (M_r - L_r)/M_r \times D_t/D_i$$

wherein:

$M_r$ — is the number of revolutions per time unit of the motor;

$L_r$ — is the number of revolutions per time unit of the load;

$D_t$ — is the number of teeth (or pitch diameter) of the gear $t$;

$D_i$ — is the number of teeth (or pitch diameter) of the gear $i$.

Assuming that $D_t = D_i$, ($D_t/D_i = 1$), then application of the formula to the various examples discussed above gives the following results: (1) The motor revolves, say at 100 r.p.m., and the load is stationary:

$$M_r = 100, L_r = 0$$

The ratio: 1:1 + 100 − 0/100 or 1:2/

(2) The motor runs at 100 r.p.m. and the load at 50 r.p.m. The ratio 1:1 + 100 − 50/100 or 1:1 + 0.5 or 1:1.5

(3) The motor and the load run at the same speed ("equilibrium"):

$$M_r = L_r;$$

The Ratio: 1:1 + 0 or 1:1

(4) The motor runs at 100 r.p.m. and the load at 150 r.p.m. The ratio: 1:1 + 100 − 150/100 or 1:1 − 0.5 or 1:0.5 or 2:1

Figure 2:
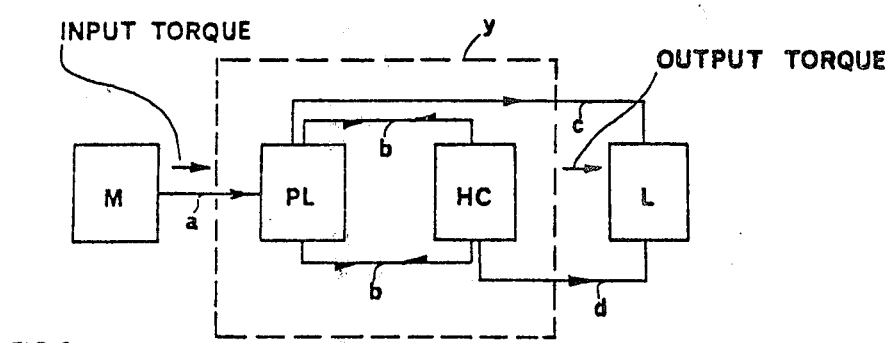
FIG. 2 is a block diagram illustrating the operation principles of the transmission methods and systems of this invention.

The block diagram given in FIG. 2, represents the basic concept of the transmission system according to the invention.

The essential components of the transmission system are the planetary system PL and the hydraulic torque coupling HC constituting the closed system $y$, which is supplied with the INPUT TORQUE by the motor M, and delivers the OUTPUT TORQUE to the load L, in the following manner:

M supplies revolutional movement to PL, as represented by the path $a$. PL and HC are interconnected to form feedback loop $b$ which acts to equalize the rotational movement of both, by portioning the INPUT TORQUE as a function of the magnitude of the load at any given instant, as represented by the paths $c$ and $d$, $c$ being the component attributed by the mechanical torque, and $d$ the component attributed by the hydraulic torque. The sum vector of both INPUT TORQUE components constitutes the OUTPUT TORQUE which equals the INPUT TORQUE (less the internal losses). At equilibrium, the effect of the feedback loop $b$ is mostly operative to compensate for the internal losses within the system $y$.

Figure 3:
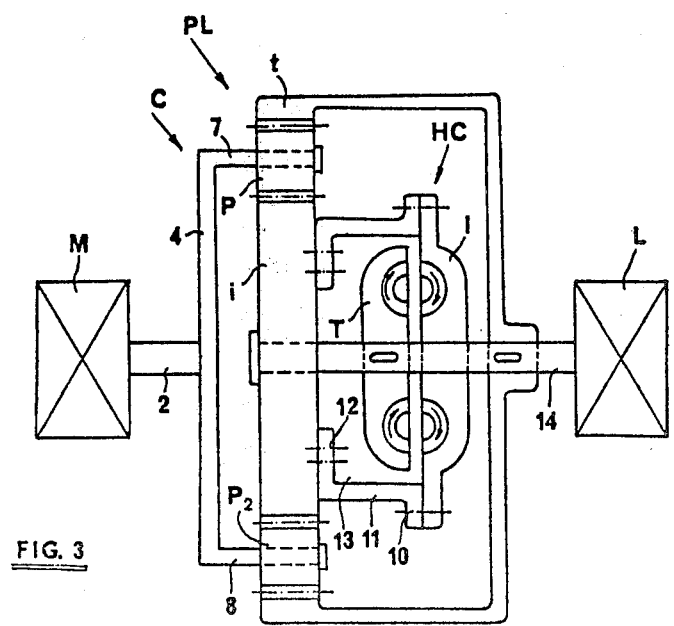
FIG. 3 shows schematically a second embodiment of the invention comprising a planetary gear train having sun and annulus members.
Figure 4:
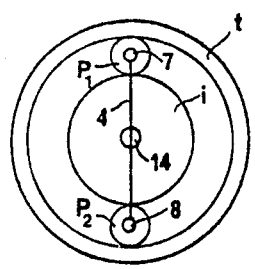
FIG. 4 is a detail of FIG. 3.

Referring now to FIGS. 3 and 4, there is shown another embodiment of the system according to the present invention. The same reference characters as in FIG. 1 have been used to designate identical or equivalent components of the system.

The motor M drives the pair (or any other number) of planet spur gears $P_1$, $P_2$ through the carrier member C comprised of the cross-member of arm 4 and the axles 7 and 8.

The planetary system PL comprises the planets $P_1$, $P_2$, the sun gear $i$ and the annulus gear $t$ formed as an internal toothed ring. Gear $t$ is mounted on and keyed to shaft 14 as shown.

The hydraulic coupling HC is constructed and associated with gears $i$ and $t$, with shaft 14 and with the load L, in the same manner as in the embodiment described with reference to FIG. 1.

The operation analysis of this embodiment shall now be briefly discussed, as it follows in every detail that of the former embodiment.

Motor Starts — Load Stationary

Planets $P_1$, $P_2$ are driven by the carrier C and perform a rolling movement along the inner circumference of the annulus $t$, while also rotating about their respective axles 7, 8. This rotation is transmitted to gear $i$, which is freely rotatable of shaft 14. Impeller I starts to exert hydraulic torque on turbine T. Unless a corresponding responsive rotation of the turbine wheel and the ring $t$ is effected, the reactive hydraulic torque will induce a certain resistive moment against the rotation of the sun $i$ through planets $P_1$, $P_2$ thereby developing a reactive mechanical torque exerted by the planets on the annulus $t$. Both the hydraulic torque on the turbine and the said reactive mechanical torque on the annulus act in the same direction — which coincide with the direction of the motor's input torque — the combined effect being to transmit the input power to the load L, via the planetary transmission gear train $i - P - t$, and wheels $I - T$ of the hydraulic coupling.

Since for every one complete revolution of the motor or shaft 2, the gear i will perform $(1+D_t/D_i)$ revolutions, $D_t$ being greater than $D_i$ — the speed of the impeller wheel will be more than twice the motor's speed (note that in former example the impeller speed was twice the motor's speed). An amplified hydraulic torque is thus achieved. This amplified hydraulic torque initiates the rapid development of the mechanical torque, as above explained.

Motor Runs at Constant Speed — Load Starts to Gain

Once shaft 14 starts to rotate, the hydraulic reactive torque is reduced and the resulting reduction in the mechanical torque now manifests itself as hydraulic torque.

This process gradually develops, until substantially all power is transduced by the hydraulic coupling to be directly transferred to the load via the turbine T. At that instance the above referred-to equilibrium position is reached, where $P_1$ and $P_2$ discontinue their spinning between ring t and gear $i$. The overall transfer ratio speed is 1:1.

Speed Fluctuations

The same considerations as above explained with respect to relatively small changes in the motor's speed are validly applicable with respect to this embodiment. The inherent feedback effect — constituting a characteristic feature of the method and system of this invention — always drives it towards a complete balance between the input and the output powers supplied by the motor and consumed by the load, respectively, for any given input velocity of the motor.

The "Braking" Effect

Should the load tend to overrun the motor, annulus $t$ will drive the planetary gear train to cause planets $P_1$, $P_2$ to rotate in the opposite direction. Sun $i$ and impeller I will slow down due to the resistance generated in the hydraulic coupling. This effect, besides acting directly to impede the load, manifests itself also in a mechanical torque tending to speed-up the motor. Provided that the motor is capable of developing enough braking power to maintain its former speed, this will immediately be reflected back on the load to slow it down back to the equilibrium state corresponding to the motor's speed. Thus again, a compounded hydraulic mechanical braking moment is operative.

The mathematical representation of the gear transmission ratio is the same as specified above with respect to FIG. 1 embodiment, except that the factor $D_t/D_i$, being greater than 1, thus effecting the overall transmission ratio.

Figure 5:
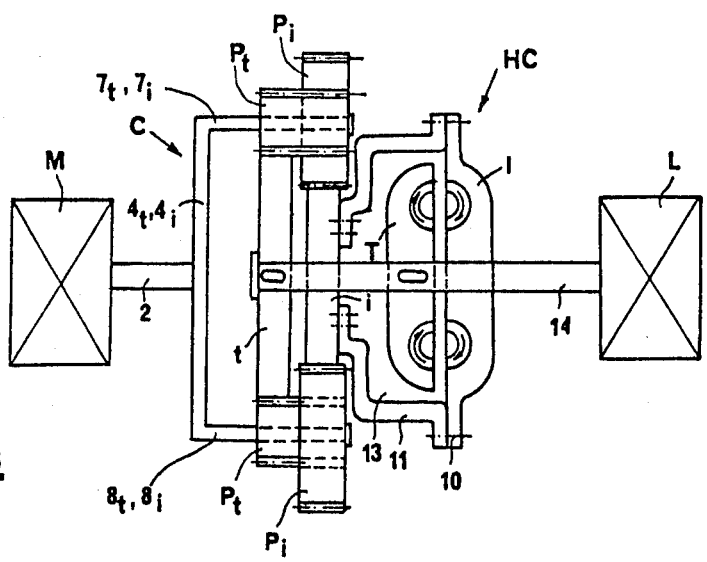
FIG. 5 shows schematically a third embodiment of the invention comprising a planetary gear train having a pair of planet gear sets and a pair of sun gears.
Figure 6:
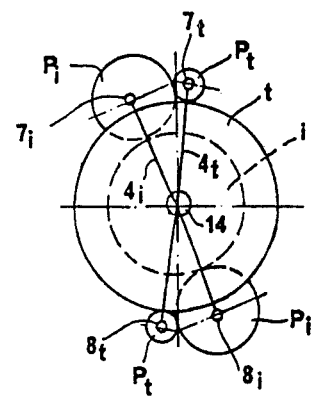
FIG. 6 is a detail of FIG. 5.

FIGS. 5 and 6 show a still further constructional manner by which the principles of this invention may be put into practice.

The motor M drives the shaft 2, to which there are connected a pair of cross-members $4_t$ and $4_i$ (FIG. 6), which together with axles $7_t$, $8_t$, and $7_i$, $8_i$, form the carrier C.

On shaft 14 leading the load L there are mounted the following components: Impeller wheel I, turbine wheel T, sun gear $i$, which is connected to the impeller wheel I by housing member 11 and bolts 12, and a second sun gear $t$. Turbine T and gear t are fixedly mounted on or keyed to shaft 14, while impeller I and gear $i$ are freely rotatable thereon.

There are two sets of planet gears, $P_i$ and $P_t$, that mesh with each other and also with gears i and t, respectively, as best seen in FIG. 6. As seen in FIGS. 5 and 6, the carriage C couples the planet gears $P_i$ and $P_t$ to the prime mover M.

The operation of the system is as follows:

When the motor stars while the load is blocked, planets $P_t$, $P_i$ start rolling about the axis of shaft 2 at $M_r$ revolutions per time unit. Since gear t is stationary, planets $P_t$ perform also rotational movement about axles $7_t$ and $8_t$ at a velocity $P_{t_r} = M_r \times (1 + D_t/D_{P_t})$. This velocity is transferred to gear $i$ via planets Pi, to reach a velocity $i_r = P_{t_r} \times D_P/D_i$; or $i_r = M_r \times (1 + D_t/D_{P_t}) \times D_P/D_i = M_r \times (D_{P_t}/D_i + D_t/D_i) = M_r \times (D_{P_t} + D_t/D_i)$ As long as $(D_{P_t} + D_t)$ will be so designed to exceed $D_i$, the velocity of the impeller I will be greater than the input velocity $M_r$, thereby assuring the generation of the increased initial hydraulic torque and the corresponding mechanical torque as above explained with reference to the former embodiments.

The behavior of the system under any other working conditions such as approaching the equilibrium position, speed fluctuations, and "braking", is much the same as already described and it need not be further explained.

Figure 7:
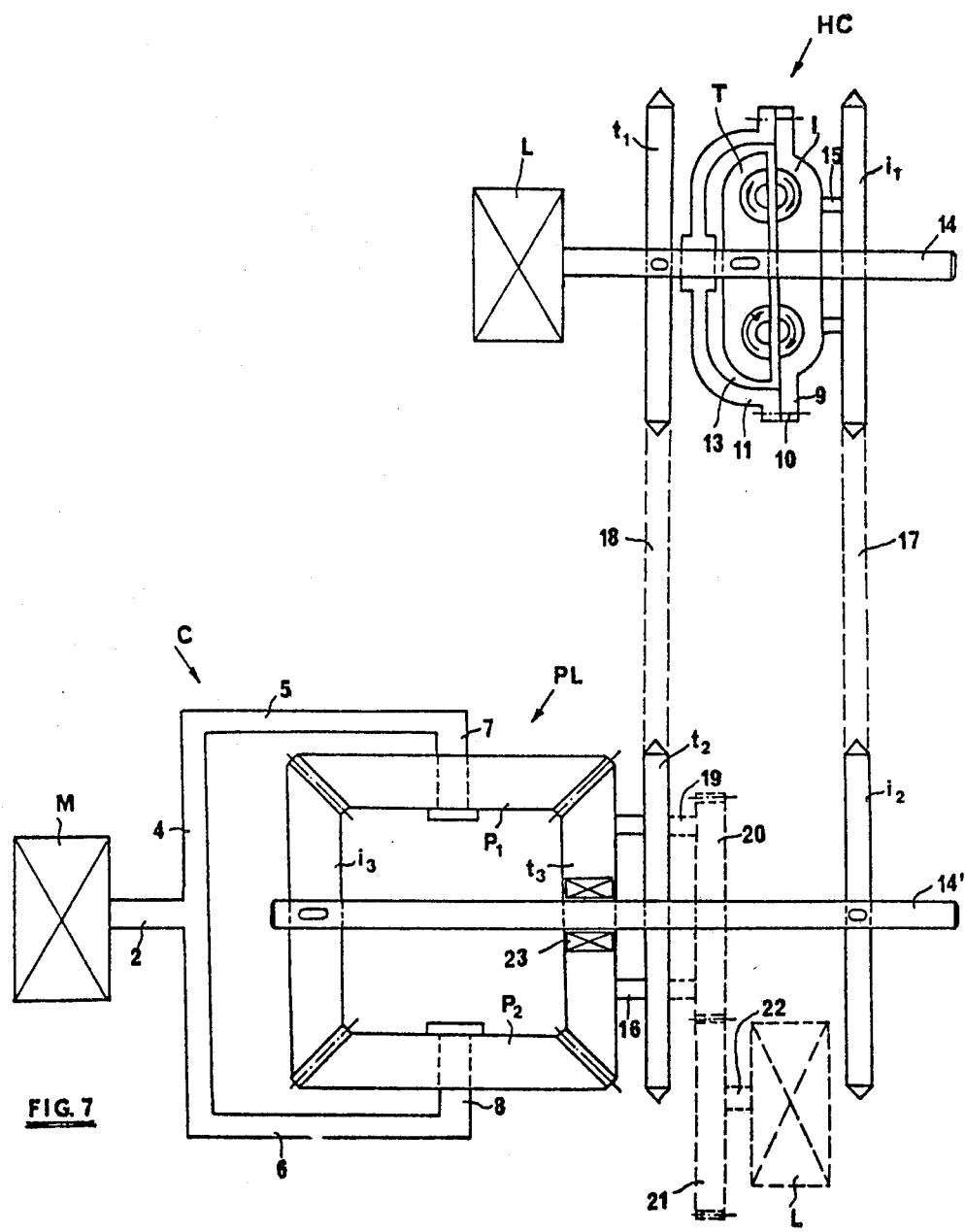
FIG. 7 shows schematically a fourth embodiment of the invention wherein the planetary system and the hydraulic coupling are mounted each on a separate shaft.

In FIG. 7 there is shown an example of the system according to the present invention, wherein the planetary system and the hydraulic coupling are mounted on separate shafts, the shafts being distanced from each other.

In the illustrated construction the shafts are parallel, but it should be noted that any other arrangement — such as the shafts being at any angle with respect to each other, whether in a common plane or in different planes may be employed, as convenient for any particular use of the system.

The mechanical subassembly — comprising the motor M, carrier C, and planetary system PL — is identical to that of FIG. 1, except that the sun gear $i_3$, associated with the impeller I (in the manner to be explained below), is fixedly mounted on or keyed to a shaft 14'; sun gear $t_3$, which is connected to the turbine T, is rotatably mounted on the same shaft.

The hydraulic subassembly is constituted by the load L driven by shaft 14 on which the hydraulic coupling HC is mounted. The impeller wheel I is rigidly connected on the one side thereof, e.g. by flange 15, to a first sprocket gear wheel or pulley $i_1$, and on the other side — to the housing 11, both wheels I, $i_1$ and the housing 11 are freely rotatable on shaft 14. Locked to the shaft 14 there are mounted the turbine T and a second sprocket gear wheel $t_1$, as shown.

Sprocket $i_1$ is connected by the chain 17 to sprocket $i_2$ keyed to shaft 14', and sprocket $t_1$ is connected by the chain 18 to sprocket $t_2$ which is rigidly connected to sun gear $t_3$ by the flange 16. It goes without saying that the sprocket and chain arrangement may be substituted by "V" belts, toothed gears, friction wheels, or any other conventional transmission means.

Alternatively, the load L may be driven via a gear train (or equivalent means) mounted on the shaft 14' as shown in dashed lines in FIG. 7. The flange 19 rigidly connects the gear 20 to the sprocket $t_2$. Gear 21 meshes with gear 20 and transfers the rotational movement to the load L through the shaft 22.

The system functions as follows:

Motor M drives planets $P_1$, $P_2$ about sun gear $t_3$ which does not rotate except with the load L. Therefore, gear $i_3$ is driven by the planets, which brings about the rotation of sprockets $i_2$ and $i_1$ and the impeller I.

The combined hydraulic and mechanical torque acts to drive the load L, i.e. to rotate shaft 14. Should such rotation be initiated, and gradually increased, turbine T, sprockets $t_1$, $t_2$ and sun gear $t_3$ will start to rotate, causing gear $i_3$ to decrease its speed until an equilibrium state is achieved wherein all components of the system revolve at one and the same speed, provided that both chain (and the gear train 2-21, if the alternative load driving method is used) transmission ratios are 1:1. Should the ratios be other than 1:1, or differ from each other, then the system shall, nevertheless, balance itself, but on two distinct and different speeds — of the motor and the planetary subassembly on the one hand, and of the load and the hydraulic subassembly on the other hand — while the impeller and turbine wheels may revolve in unison or at different speeds, as the case may be.

These last mentioned features open a great many possibilities of different designs, to match various operational conditions and wide-range ratios requirements. For example, it enables to utilize a relatively small power/speed rates hydraulic coupling in combination with a high power/speed motor, and vice-versa, or the operation of a plurality of prime movers and/or loads, either in series or in parallel.

For the purposes of general illustration and in fact applicable to any configuration and embodiment of this invention, there has been schematically shown in FIG. 7 an overrun clutch device 23 (see also FIG. 9), about which the sun gear $t_3$ is rotatably mounted. It is well known in the art to employ such devices for ensuring unidirectional rotation, which otherwise may be undesirable and even dangerous (e.g. in hoisting installations). The overrun clutch may be installed at any part of planetary and/or hydraulic subassemblies, according to design considerations.

It will be readily understood from the foregoing description that the essential principles of operation of the system according to this embodiment are substantially the same as those governing the operation of all preceding embodiments.

Figure 8:
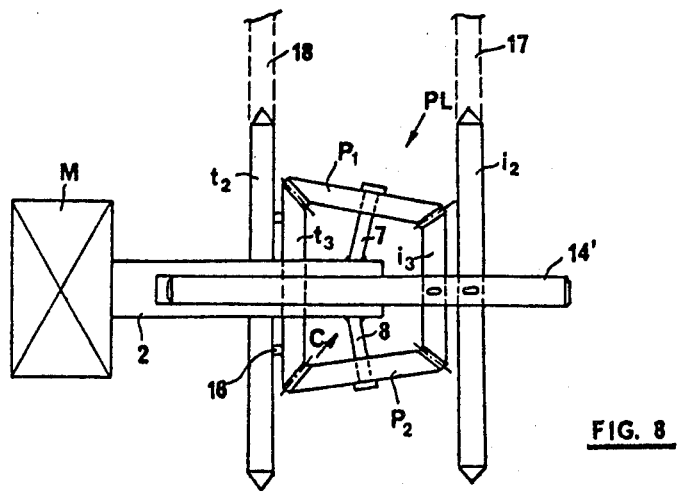
FIG. 8 shows a modified mounting arrangement of a differential gear system for the embodiment of FIG. 7.

FIG. 8 illustrates an alternative construction of the carrier assembly of the system of FIG. 7. While this construction is described in conjunction with the "double shaft" embodiment, it will be readily understood that identical principles of design may be applied to any of the embodiments so far described, or modifications thereof.

Shaft 2 of the motor M is axially extended, and terminates at about the center of the planetary unit PL comprised of the conical sun gears $t_3$ and $i_3$ and the planets $P_1$ and $P_2$. As shown, the gear $i_3$ has a pitch diameter smaller than that of gear $t_3$, resulting in a ratio other than 1:1 as in FIGS. 1 and 7. (This construction is known in the art as "Humpage's" gear train.)

Planets $P_1$ and $P_2$ are journaled on axles 7, 8 in the form of two arms fixed to the shaft 2. Gear $t_3$ and sprocket $t_2$ — interconnected by the flange 16 — are rotatable on the shaft 2.

Gear $i_3$ and sprocket $i_2$ are keyed on a shaft 14' which is partly enclosed within a cavity in the shaft 2 forming a bearing of shaft 14'.

The operation of this system is exactly the same as above described with reference to FIG. 7.

Figure 9:
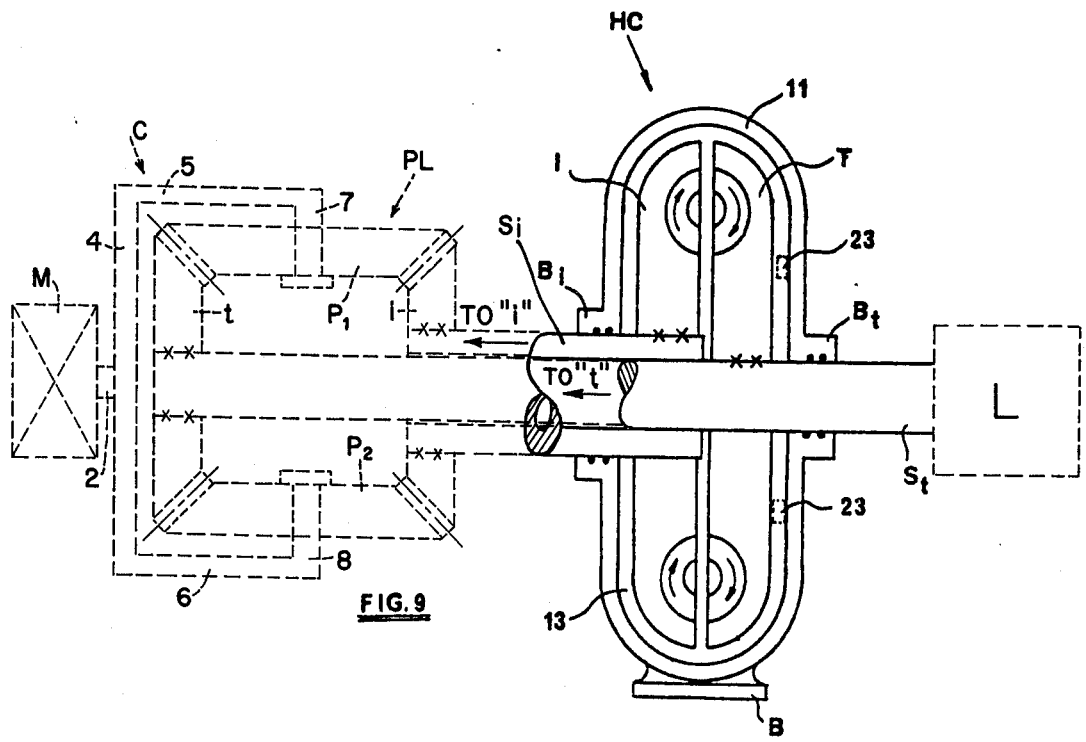
FIG. 9 shows a modified arrangement of coupling the impeller and turbine wheels to their corresponding members of the planetary system.

FIG. 9 shows a modified mounting arrangement of the hydraulic coupling assembly HC, which may be readily applied to any of the so far described embodiments of the present invention. Therefore, the construction shall be only schematically shown and described in its broadest aspects, it being understood that minor modifications — such as exchanging the positions of the impeller and the turbine, if required — may easily be applied by any skilled person following the teachings of this invention.

Common hydraulic couplings comprise essentially an impeller, mounted on an input shaft, a turbine mounted on an output shaft, and a housing providing a space for the hydraulic fluid.

In the preceding examples, it has been shown that the housing member proper was utilized to establish rigid connection between the impeller wheel and its respective planetary gear member. Also, a single shaft has been employed, where either the impeller or the turbine have been keyed hereto.

Should it be desirable to keep the housing stationary, or may it be for other design considerations, the configuration of FIG. 9 may provide a satisfactory solution. A pair of coaxial shafts $S_i$ and $S_t$ are provided, $S_i$ being rotatable within the hollow of $S_t$. Shaft $S_i$ ends substantially at the middle plane of the hydraulic coupling unit and extends outwards to one side of the housing. The impeller wheel I is fixed to shafts $S_i$ and the turbine wheel T — to shaft $S_t$. The housing has suitable sealed bearings $B_i$ and $B_t$, and may be supported by a base plate B.

Application of this alternative construction to the transmission system of the present invention would be effected by coupling the gear (s) "$i$" (associated with the impeller I) to the shaft $S_i$ and the gear (s) "$t$" — to shaft $S_t$.

In certain instances, it may be found useful not to have the housing stationary, neither to combine the rotation thereof with that of the impeller wheel — but rather with the turbine wheel. What is merely required in such a case is to arrest the turbine T to the housing 10, e.g. by a flange 23 shown in dotted lines in FIG. 9.

With particular reference to the illustrated preferred embodiments, it will be apparent that the disclosed apparatus and methods drive the hydraulic torque coupling HC through the planetary system PL, as readily seen in FIGS. 1, 3, 5 and 7, for example.

Having thus described the invention with particular reference to the preferred embodiments thereof, it will be obvious to those skilled in the art to which the invention pertains, after understanding the invention, that various changes and modifications may be made therein without departing from the spirit and scope of the invention, as defined by the claims appended hereto.

For example, there are known in the art various other types of planetary systems besides those specifically referred to hereinabove, such as worm differential planetary gear trains, friction planetary systems, harmonic planetary systems, cam operated planetary systems, and others. Furthermore, any internal configuration of the system components, namely the planet, sun and annulus members by any number and in all interchangement modes (such as the well known Humpage's gear), are equally applicable for the purposes of this invention.

Furthermore, there may be devised a construction wherein the complete planetary system is enclosed in a space centrally located within the housing of the hydraulic torque coupling, i.e. in between the impeller and the turbine wheels.

As for the employed hydraulic system, namely the hydraulic coupling and the torque converter, besides the types hereinabove described, there are known in the art specially designed devices, e.g. comprising a plurality of turbine wheels in series, special deflecting arrangements for the stator blades, fluid level filling controls, etc.

It is thus readily understood that consideration of power capacity, transmission ratios and ranges, installation requirements, etc. may all be taken into account and reasonably satisfied by employing any of the above mentioned systems and/or combinations thereof.

Regarding other possible applications of the invention, it should be emphasized that the transmission system thereof may be installed in all kinds of machinery such as mining vehicles, tractors, military vehicles, excavators, locomotive vessels and aircraft; among typical non-vehicular machinery there should be mentioned pumps, compressors, stone crushers, mixers, oil well drills, hoisting and conveyor equipment, cold-strip rolling mills, tube-drawing and pipe welding machines.

I claim:

1. A method of torque transmission between a prime mover and a load, comprising in combination the steps of:
   providing a planetary system including first, second and third members;
   providing a hydraulic torque coupling having an input and an output;
   interconnecting said planetary system and said hydraulic torque coupling in a feedback loop by rigidly connecting said first member to said input and rigidly connecting said output with said second member;
   coupling said prime mover to said third member of the planetary system; and
   transferring the output torque of the planetary system and the hydraulic torque coupling from said second member and said output to the load.

2. A method as claimed in claim 1, wherein:
   said hydraulic torque coupling is provided with an impeller wheel at said input and a turbine wheel providing output torque at said output;
   a first portion of the output torque of said first member is transferred to the impeller wheel of the hydraulic torque coupling;
   a second portion of the output torque of said first member is transferred to the load;
   a first portion of the output torque of the turbine wheel is transferred to said second member;
   a second portion of the output torque of said turbine wheel is transferred to the load; and
   said method includes the steps of rigidly connecting said first member to said impeller wheel, and rigidly connecting said turbine wheel to said second member.

3. A method as claimed in claim 2, wherein:
   said second portion of the output torque of said first member is transferred to the load via said second and third members.

4. A method as claimed in claim 3, wherein:
   said first and second members comprise sun and annulus members, respectively;
   output torque of said annulus member is transferred to the load;
   output torque of the sun member is transferred to the impeller wheel of the hydraulic torque coupling by rigidly connecting the sun member to the impeller wheel; and
   the output torque of the turbine wheel of the hydraulic torque coupling is transferred to the annulus member and to the load.

5. A transmission system for operation between a prime mover and a load, comprising in combination:
   a planetary system including first, second and third members;
   a hydraulic torque coupling having an input and an output;
   means for providing a feedback loop including said planetary system and said hydraulic torque coupling, said feedback loop providing means including means for rigidly connecting said first member to said input, and means for rigidly connecting said output to said second member;
   means connected to said planetary system for coupling said third member of the planetary system to said prime mover; and
   means coupled to said second member of the planetary system and said output of the hydraulic torque coupling for transferring output torques of said planetary system and said hydraulic torque coupling to the load.

6. A transmission system as claimed in claim 5, wherein:
   said planetary system includes a sun member as one of said first and second members and an annulus member as the other of said first and second members;
   said hydraulic torque coupling includes an impeller wheel at said input and a turbine wheel at said output;
   said system includes means for rigidly connecting one of said sun and annulus members to one of said impeller and turbine wheels; and
   said system includes means for rigidly connecting the other of said sun and annulus members to the other of said impeller and turbine wheels.

7. A transmission system as claimed in claim 6, wherein:

the sun member is rigidly connected to the impeller wheel and the annulus member is rigidly connected to the turbine wheel.

8. A transmission system as claimed in claim 5, wherein:
said planetary system includes an external gear planet member;
said first member is an external gear sun member meshing with said planet member; and
said second member is an internal gear annulus member.

9. A transmission system for operation between a prime mover and a load, comprising in combination:
first and second shafts;
a planetary system including first, second and third members;
means for fixedly mounting the first member on the first shaft;
means for rotatably mounting said second member on the first shaft;
a hydraulic torque coupling having an input and an output, with an impeller wheel at the input and a turbine wheel at the output of said hydraulic torque coupling, the impeller wheel being rotatably mounted on the second shaft;
means for fixedly mounting the turbine wheel on the second shaft;
means for providing a feedback loop including said planetary system and said hydraulic torque coupling, said feedback loop providing means including means for coupling the impeller wheel to the first shaft and means for coupling the second member to the second shaft;
means connected to said planetary system for coupling said third member of the planetary system to said prime mover; and
means coupled to said second member of the planetary system and said output of the hyraulic torque coupling for transferring output torques of said planetary system and said hydraulic torque coupling to the load.

10. A transmission system as claimed in claim 9, including:
means for connecting the load to said second shaft.

11. A transmission system as claimed in claim 9, wherein:
said means for coupling the second member to the second shaft include first and second pulleys and means for coupling said first pulley to said second pulley, said first pulley being rotatable relative to said first shaft;
means for rigidly connecting the second member to the first pulley;
means for fixedly mounting said second pulley on said second shaft;
said means for coupling the impeller wheel to the first shaft include third and fourth pulleys and means for coupling said third pulley to said fourth pulley, said third pulley being rotatable relative to said second shaft;
means for rigidly connecting the impeller wheel to said third pulley; and
means for fixedly mounting said fourth pulley on said first shaft.

12. A transmission system as claimed in claim 11, including:
means for connecting the load to said second pulley.

13. A transmission system as claimed in claim 5, wherein:
said hydraulic torque coupling has an impeller wheel at said input and a turbine wheel at said output;
said means for rigidly connecting said first member to said input include a first shaft and means for fixedly mounting the first member and the impeller wheel on the first shaft;
said means for transferring output torques of said planetary system and said hydraulic torque coupling to the load include a second shaft, with said first and second shafts being coaxial; and
said means for rigidly connecting said output to said second member include means for fixedly mounting the second member and the turbine wheel on the second shaft.

14. A transmission system as claimed in claim 13, wherein:
one of said first or second shafts is hollow and rotatably mounted on the other of said first or second shafts.

15. A transmission system as claimed in claim 14, wherein:
both said first and second shafts are rotatable.

16. A transmission system as claimed in claim 14, including a housing for the hydraulic torque coupling; and
means for rigidly coupling one of said impeller and turbine wheels to said housing.

17. A transmission system as claimed in claim 6, wherein:
said planetary system includes a planet member as said third member; and
said planet, sun and annulus members are cylindrical gear members.

18. A transmission system as claimed in 5, wherein:
said planetary system includes a planet member as said third member; and
said first, second and planet members are conical gear members.

19. A transmission system as claimed in claim 5, wherein:
said planetary system includes a plurality of planet gears.

20. A transmission system as claimed in claim 5, wherein:
said third member includes first planet gear means;
said planetary system includes second planet gear means meshing with said first planet gear means;
said first member includes a first sun gear meshing with the second planet gear means; and
said second member includes a second sun gear meshing with the first planet gear means.

21. A transmission system as claimed in claim 5, wherein:
said second member includes first sun gear means;
said first member includes second sun gear means;
said planetary system includes first planet gear means meshing with said second sun gear means, and second planet gear means meshing with said first sun gear means and said first planet gear means;
said hydraulic torque coupling includes an impeller wheel at said input and a turbine wheel at said output; and
said transmission system includes means for coupling said prime mover to said first planet gear means, means for rigidly connecting said impeller wheel to one of said first and second sun gear means, and means for rigidly connecting said turbine wheel to the other of said first and second sun gear means and for coupling said other sun gear means and said turbine wheel to said load.

22. A transmission system for operation between a prime mover and a load, comprising in combination:
a planetary system including first, second and third members;
a hydraulic torque coupling having an input and an output;
means for providing a feedback loop including said planetary system and said hydraulic torque coupling, said feedback loop providing means including means for interconnecting said first member with said input, and means for interconnecting said output with said second member;
means connected to said planetary system for coupling said third member of the planetary system to said prime mover; and
means coupled to said second member of the planetary system and said output of the hydraulic torque coupling for transferring output torques of said planetary system and said hydraulic torque coupling to the load;
said planetary system including a sun member as one of said first and second members and an annulus member as the other of said first and second members;
said hydraulic torque coupling including an impeller wheel at said input and turbine wheel means at said output;
said system including means for coupling said sun member to said impeller wheel and said annulus member to said turbine wheel; and
said system including a shaft and means for mounting the sun and annulus members and the impeller and turbine wheels on said shaft.

23. A transmission system as claimed in claim 22, wherein:
the sun member and the impeller wheel are rotatably mounted on said shaft; and
the annulus member and the turbine wheel are fixedly mounted on said shaft.

24. A transmission system as claimed in claim 23, including:
means for rigidly connecting the sun member to the impeller wheel.

25. A transmission system as claimed in claim 23, including:
a housing for the hydraulic torque coupling; and
means for rigidly connecting the sun member to the impeller wheel via said housing.

26. A transmission system as claimed in claim 25, wherein:
said housing comprises a cylindrical member adapted to be connected at one side thereof to the sun member and at the other side thereof to the impeller wheel.

27. A self-balancing continuous power transmission method of transmitting power at continuously varying power/speed transmission ratios between a prime mover and a variable load, comprising in combination the steps of:
providing a planetary system including first, second and third members;
providing a hydraulic torque coupling having an input and an output;
interconnecting said planetary system and said hydraulic torque coupling in a feedback loop by rigidly connecting said first member to said input and rigidly connecting said output to said second member;
coupling said prime mover to said third member of the planetary system;
transferring both the output torque of the planetary system and the output torque of the hydraulic torque coupling from said second member and said output to the load; and
automatically and continuously adapting through said feedback loop, and in response to power/speed fluctuations, output power of the planetary system and hydraulic torque coupling to input power provided by the prime mover.

28. A method as claimed in claim 27, wherein:
torque provided by the prime mover is portioned with said feedback loop as a function of the magnitude of the load into a first component attributed to the planetary system and into a second component attributed to the hydraulic torque coupling and said first and second components are constituted as output torque to the load.

29. A self-balancing continuous power transmission method of transmitting power at continuously varying power/speed transmission ratios between a torque providing prime mover and a variable load, comprising in combination the steps of:
providing a planetary system including first, second and third members;
providing a hydraulic torque coupling having an input and an output;
interconnecting said planetary system and said hydraulic torque coupling in a feedback loop by rigidly connecting said first member to said input and rigidly connecting said output to said second member;
coupling said prime mover to the third member of the planetary system;
transferring the output torques of the planetary system and the hydraulic torque coupling from said second member and said output to the load; and
portioning with said feedback loop as a function of the magnitude of the load the torque provided by the prime mover into a first component attributed to the planetary system and into a second component attributed to the hydraulic torque coupling and constituting said first and second components as output torque for the load.

30. A self-balancing continuous power transmission system for transmitting power at continuously varying power/speed transmission ratios between a prime mover and a variable load, comprising in combination:
a planetary system including first, second and third members;
a hydraulic torque coupling having an input and an output;
means connected to said planetary system for coupling said third member of the planetary system to said prime mover;
means coupled to said second member of the planetary system and said output of the hydraulic torque coupling for transferring both the output torque of said planetary system and the output torque of said hydraulic torque coupling to the load; and
means for providing a feedback loop including said planetary system and said hydraulic torque coupling and for automatically and continuously adapting through said feedback loop, and in response to power/speed fluctuations, output power of the planetary system and hydraulic torque coupling to input power provided by the prime mover, said feedback loop providing means including means for rigidly connecting said first member to said input, and means for rigidly connecting said output to said second member.

31. A system as claimed in claim 30, wherein:
said feedback loop includes means for portioning torque provided by the prime mover as a function of the magnitude of the load into a first component attributed to the planetary system and into a second component attributed to the hydraulic torque coupling, whereby said first and second components are constituted as output torque to the load.

32. A self-balancing continuous power transmission system for transmitting power at continuously varying power/speed transmission ratios between a prime mover and a variable load, comprising in combination:
a planetary system including first, second and third members;
a hydraulic torque coupling having an input and an output;
means connected to said planetary system for coupling said third member of the planetary system to said prime mover;
means coupled to said second member of the planetary system and said hydraulic torque coupling for transferring output torques of said planetary system and said hydraulic torque coupling to the load; and
means for providing a feedback loop including said planetary system and said hydraulic torque coupling for portioning, as a function of the magnitude of the load, torque provided by the prime mover into a first component attributed to the planetary system and into a second component attributed to the hydraulic torque coupling whereby said first and second components are constituted as output torque for the load, said feedback loop providing means including means for rigidly connecting said first member to said input, and means for rigidly connecting said output to said second member.

33. A method of torque transmission between a prime mover and a load, comprising in combination the steps of:
providing a planetary system with first, second and third members;
providing a hydraulic torque coupling with an impeller wheel and a turbine wheel;
interconnecting said planetary system and said hydraulic torque coupling in a feedback loop;
coupling said prime mover to said third member;
rigidly connecting one of said first and second members to the impeller wheel and transferring a first portion of the output torque of said one of said first and second members to the impeller wheel of the hydraulic torque coupling;
transferring a second portion of the output torque of said one of said first and second members to the load;
rigidly connecting the turbine wheel to the other of said first and second members and transferring a first portion of the output torque of the turbine wheel to the other of said first and second members; and transferring a second portion of the output torque of said turbine wheel to the load.

34. A method as claimed in claim 33, wherein:
said second portion of the output torque of said one of said first and second members is transferred to the load via the other of said first and second members.

35. A method as claimed in claim 34, wherein:
said first and second members comprise sun and annulus members, respectively;
the output torque of said annulus member is transferred to the load;
the sun member is rigidly connected to the impeller wheel and the output torque of the sun member is transferred to the impeller wheel of the hydraulic torque coupling; and
the turbine wheel is rigidly connected to the annulus member and the output torque of the turbine wheel of the hydraulic torque coupling is transferred to the annulus member and to the load.

36. A transmission system for operation between a prime mover and a load, comprising in combination:
a planetary system including a sun member, a planet member and an annulus member;
a hydraulic torque coupling including an impeller wheel and a turbine wheel;
means for providing a feedback loop including said planetary system and said hydraulic torque coupling and including means for coupling one of said sun and annulus members to one of said impeller and turbine wheels and means for coupling the other of said sun and annulus members to the other of said impeller and turbine wheels;
means connected to said planetary system for coupling said planet member to said prime mover; and
means coupled to said planetary system and said hydraulic torque coupling for transferring output torques of said planetary system and said hydraulic torque coupling to the load.

37. A transmission system as claimed in claim 36, wherein:
the sun member is coupled to the impeller wheel and the annulus member is coupled to the turbine wheel.

38. A transmission system as claimed in claim 37, including:
a shaft; and
means for mounting the sun and annulus members and the impeller and turbine wheels on said shaft.

39. A transmission system as claimed in claim 38, wherein:
the sun member and the impeller wheel are rotatably mounted on said shaft; and
the annulus member and the turbine wheel are fixedly mounted on said shaft.

40. A transmission system as claimed in claim 39, including:
means for rigidly connecting the sun member to the impeller wheel.

41. A transmission system as claimed in claim 39, including:
a housing for the hydraulic torque coupling; and
means for rigidly connecting the sun member to the impeller wheel via said housing.

42. A transmission system as claimed in claim 41, wherein:
said housing comprises a cylindrical member adapted to be connected at one side thereof to the sun member and at the other side thereof to the impeller wheel.

43. A transmission system as claimed in claim 36, including:
  first and second shafts;
  means for rotatably mounting the sun member on the first shaft;
  means for fixedly mounting the annulus member on the first shaft;
  means for rotatably mounting the impeller wheel on the second shaft;
  means for fixedly mounting the turbine wheel on the second shaft; and
  means for coupling the sun member to the second shaft and the impeller wheel to the first shaft.

44. A transmission system as claimed in claim 43, including:
  means for connecting the load to said second shaft.

45. A transmission system as claimed in claim 43, including:
  first, second, third and fourth pulleys;
  means for rigidly connecting the sun member to the first pulley, said first pulley being rotatably mounted on said first shaft;
  means for coupling said first pulley to said second pulley;
  means for fixedly mounting said second pulley on said second shaft;
  means for rigidly connecting the impeller wheel to said third pulley, said third pulley being rotatably mounted on said second shaft;
  means for coupling said third pulley to said fourth pulley; and
  means for fixedly mounting said fourth pulley on said first shaft.

46. A transmission system as claimed in claim 45, including:
  means for connecting the load to said second pulley.

47. A transmission system as claimed in claim 37, including:
  first and second coaxial shafts;
  means for fixedly mounting the sun member and the impeller wheel on the first shaft; and
  means for fixedly mounting and annulus member and the turbine wheel on the second shaft.

48. A transmission system as claimed in claim 47, wherein:
  one of said first or second shafts is hollow and rotatably mounted on the other of said first or second shafts.

49. A transmission system as claimed in claim 48, wherein:
  both said first and second shafts are rotatable.

50. A transmission system as claimed in claim 48, including:
  a housing for the hydraulic torque coupling; and
  means for rigidly coupling one of said impeller and turbine wheels to said housing.

51. A transmission system as claimed in claim 36, wherein:
  said planet member is an external gear planet member;
  said sun member is an external gear sun member; and
  said annulus member is an internal gear annulus member.

52. A transmission system as claimed in claim 36, wherein:
  said planet, sun and annulus members are cylindrical gear members.

53. A transmission system as claimed in claim 36, wherein:
  said planet, sun and annulus members are conical gear members.

54. A transmission system as claimed in claim 36, wherein:
  said planetary system includes first planet gear means including said planet member and meshing with said annulus member, and second planet gear means meshing with said sun member and with said second planet gear means.

55. A transmission system claimed in claim 36, wherein:
  said prime mover is an internal combustion engine of a motor vehicle, and the load is constituted by the road traction means of said vehicle.

56. A transmission system for operation between a prime mover and a load, comprising in combination:
  a planetary system including first sun gear means, second sun gear means, first planet gear means meshing with said second sun gear means, and second planet gear means meshing with said first sun gear means and said first planet gear means;
  a hydraulic torque coupling including impeller and turbine wheels;
  means for providing a feedback loop including said planetary system and said hydraulic torque coupling including means for connecting said impeller wheel to one of said first and second sun gear means, and means for coupling the other of said first and second sun gear means and the turbine wheel to said load;
  means connected to said planetary system for coupling said first planet gear means to said prime mover; and
  means coupled to said planetary system and said hydraulic torque coupling for transferring output torques of said planetary system and said hydraulic torque coupling to the load.

57. A method of torque transmission between a prime mover and a load, comprising in combination the steps of:
  providing a planetary system;
  providing a hydraulic torque coupling having an input and an output;
  interconnecting said planetary system and said hydraulic torque coupling in a feedback loop by rigidly connecting a first part of said planetary system to said input of the hydraulic torque coupling, and rigidly connecting said output of the hydraulic torque coupling to a second part of said planetary system;
  coupling said prime mover to a third part of said planetary system;
  driving said hydraulic torque coupling with said prime mover through said planetary system; and
  transferring the output torques of the planetary system and the hydraulic torque coupling to the load.

58. A method as claimed in claim 57, wherein:
  said planetary system is provided with first, second and third members;
  said hydraulic torque coupling is provided with an impeller wheel and a turbine wheel;
  said impeller wheel is rigidly connected to said first member and is driven with said prime mover through said first and third members; and said turbine wheel is rigidly connected to said second member and output torques of said second member and said turbine wheel are transferred to said load.

59. A method as claimed in claim 58, wherein:
output torque of said first member is transferred to the load via said second and third members.

60. A transmission system for operation between a prime mover and a load, comprising in combination:
a planetary system;
a hydraulic torque coupling having an input and an output;
means for providing a feedback loop including said planetary system, said hydraulic torque coupling, and means for rigidly connecting a first part of said planetary system to said input of the hydraulic torque coupling, and rigidly connecting said output of the hydraulic torque coupling to a second part of said planetary system;
means connected to said planetary system for coupling a third part of said planetary system to said prime mover;
means connected to said planetary system and to said hydraulic torque coupling for driving said hydraulic coupling with said prime mover through said planetary system; and
means coupled to said planetary system and said hydraulic torque coupling for transferring output torques of said planetary system and said hydraulic torque coupling to the load.

61. A self-balancing continuous power transmission method of transmitting power at continuously varying power/speed transmission ratios between a prime mover and a variable load, comprising in combination the steps of:
providing a planetary system;
providing a hydraulic torque coupling having an input and an output;
interconnecting said planetary system and said hydraulic torque coupling in a feedback loop by rigidly connecting a first part of said planetary system to said input of the hydraulic torque coupling, and rigidly connecting said output of the hydraulic torque coupling to a second part of said planetary system;
coupling said prime mover to a third part of said planetary system;
driving said hydraulic torque coupling with said prime mover through said planetary system;
transferring both the output torque of the planetary system and the output torque of the hydraulic torque coupling to the load; and
automatically and continuously adapting through said feedback loop, and in response to power/speed fluctuations, output power of the planetary system and hydraulic torque coupling to input power provided by the prime mover.

62. A method as claimed in claim 61, wherein:
torque provided by the prime mover is portioned with said feedback loop as a function of the magnitude of the load into a first component attributed to the planetary system and into a second component attributed to the hydraulic torque coupling and said first and second components are constituted as output torque to the load.

63. A self-balancing continuous power transmission method of transmitting power at continuously varying power/speed transmission ratios between a torque providing prime mover and a variable load, comprising in combination the steps of:
providing a planetary system;
providing a hydraulic torque coupling having an input and an output;
interconnecting said planetary system and said hydraulic torque coupling in a feedback loop by rigidly connecting a first part of said planetary system to said input of the hydraulic torque coupling, and rigidly connecting said output of the hydraulic torque coupling to a second part of said planetary system;
coupling said prime mover to a third part of the planetary system;
driving said hydraulic torque coupling with said prime mover through said planetary system;
transferring the output torques of the planetary system and the hydraulic torque coupling to the load; and
portioning with said feedback loop as a function of the magnitude of the load the torque provided by the prime mover into a first component attributed to the planetary system and into a second component attributed to the hydraulic torque coupling and constituting said first and second components as output torque for the load.

64. A self-balancing continuous power transmission system for transmitting power at continuously varying power/speed transmission ratios between a prime mover and a variable load, comprising in combination:
a planetary system;
a hydraulic torque coupling having an input and an output;
means connected to said planetary system for coupling said planetary system to said prime mover;
means coupled to said planetary system and said hydraulic torque coupling for transferring both the output torque of said planetary system and the output torque of said hydraulic torque coupling to the load; and
means for driving said hydraulic torque coupling with said prime mover through said planetary system and providing a feedback loop including said planetary system and said hydraulic torque coupling and for automatically and continuously adapting through said feedback loop, and in response to power/speed fluctuations, output power of the planetary system and hydraulic torque coupling to input power provided by the prime mover, said means for driving said hydraulic torque coupling including means for rigidly connecting a first part of said planetary system to said input of the hydraulic torque coupling, and rigidly connecting said output of the hydraulic torque coupling to a second part of said planetary system.

65. A system as claimed in claim 64, wherein:
said feedback loop includes means for portioning torque provided by the prime mover as a function of the magnitude of the load into a first component attributed to the planetary system and into a second component attributed to the hydraulic torque coupling, whereby said first and second components are constituted as output torque to the load.

66. A self-balancing continuous power transmission system for transmitting power at continuously varying power/speed transmission ratios between a prime mover and a variable load, comprising in combination:
a planetary system;

a hydraulic torque coupling having an input and an output;

means connected to said planetary system for coupling said planetary system to said prime mover;

means coupled to said planetary system and said hydraulic torque coupling for transferring output torques of said planetary system and said hydraulic torque coupling to the load; and means for driving said hydraulic torque coupling with said prime mover through said planetary system and providing a feedback loop including said planetary system and said hydraulic torque coupling for portioning, as a function of the magnitude of the load, torque provided by the prime mover into a first component attributed to the planetary system and into a second component attributed to the hydraulic torque coupling whereby said first and second components are constituted as output torque for the load, said means for driving said hydraulic torque coupling including means for rigidly connecting a first part of said planetary system to said input of the hydraulic torque coupling, and rigidly connecting said output of the hydraulic torque coupling to a second part of said planetary system.

* * * * *